(12) United States Patent
Morgan et al.

(10) Patent No.: US 6,213,331 B1
(45) Date of Patent: Apr. 10, 2001

(54) FUEL CAP HAVING BIASED SEAL

(75) Inventors: Thomas G. Morgan, Naples; David Charles Juleff, Cape Coral, both of FL (US)

(73) Assignee: Shaw Aero Development, Inc., Naples, FL (US)

( * ) Notice: Subject to any disclaimer, the term of this patent is extended or adjusted under 35 U.S.C. 154(b) by 0 days.

(21) Appl. No.: 09/020,542

(22) Filed: Feb. 9, 1998

(51) Int. Cl.$^7$ ................................................ B65D 41/06
(52) U.S. Cl. .................... 220/295; 220/297; 220/304; 220/DIG. 33
(58) Field of Search ................................. 220/293, 295, 220/297, 300–302, 304, 86.1, 86.2, DIG. 33, DIG. 32, 233–236

(56) References Cited

U.S. PATENT DOCUMENTS

| | | |
|---|---|---|
| 287,189 | 10/1883 | Stone . |
| 1,191,432 | 7/1916 | Jones . |
| 1,220,296 | 3/1917 | Vanderford . |
| 2,283,066 | 5/1942 | Ingersoll . |
| 4,416,391 * | 11/1983 | Sarrazin .................... 220/DIG. 33 X |
| 4,436,219 | 3/1984 | Reutter . |
| 5,381,919 * | 1/1995 | Griffin et al. ............. 220/DIG. 33 X |
| 5,395,004 * | 3/1995 | Griffin et al. ............. 220/DIG. 33 X |
| 5,540,347 * | 7/1996 | Griffin ...................... 220/DIG. 33 X |
| 5,615,793 * | 4/1997 | Muller ....................... 220/DIG. 33 X |

FOREIGN PATENT DOCUMENTS

| | | | |
|---|---|---|---|
| 429336 * | 5/1991 | (EP) | ............................. 220/DIG. 33 |
| 468849 * | 1/1992 | (EP) | ............................. 220/DIG. 33 |
| 675052 * | 10/1995 | (EP) | ............................. 220/DIG. 33 |

* cited by examiner

*Primary Examiner*—Nathan J. Newhouse
(74) *Attorney, Agent, or Firm*—Pennie & Edmonds LLP

(57) ABSTRACT

A one quarter turn fuel cap assembly is provided with a fuel cap and a sleeve. The assembly is closed by rotation of the cap through a one quarter turn. Following rotation, a cam permits a spring disposed in the fuel cap to expand and engage a seal against a rim of the sleeve to close the assembly without rotating the seal relative to the ring.

11 Claims, 5 Drawing Sheets

FUEL CAP HAVING BIASED SEAL

BACKGROUND

Caps for providing air-tight or water-tight seals over openings in containers and pipes are known in the art. Many of these devices are cumbersome to operate in that they require multiple turns of a handle or enough applied force to compress a spring to achieve closure. Further repeated opening and closing of the cap leads to undesirable wear of the seal, because the turning of the handle causes the seal to turn relative to the opening of the container.

A sealing cap for a gasoline tank is disclosed with a sealing ring for sealing a filler neck of the gasoline tank (U.S. Pat. No. 4,436,219). The sealing ring is attached to a lower shoulder portion of the sealing cap. A spring is disposed between the lower shoulder portion and a turning stop. When the sealing cap is inserted into the filler neck and rotated, the turning stop of the sealing cap engages tabs on the interior of the filler neck preventing further rotation of the turning stop and those parts non-rotatably engaged thereto. Subsequent rotation of the sealing cap compresses the spring disposed between the turning stop and the lower shoulder portion seating the sealing ring against the filler neck.

A cap is desired which achieves a sealed closure with only a one quarter turn in rotation without rotating the seal relative to the sealing surface of an opening of a container to prevent excessive seal wear. In addition, a cap is desired which achieves a seal closure under the force of an expanding spring upon rotation of the handle to eliminate the necessity of applying a compressive force to the spring to achieve closure.

SUMMARY OF THE INVENTION

In accordance with the present invention, Applicants have discovered a one quarter turn fuel cap assembly having a sleeve and a fuel cap and capable of achieving a sealed closure with a maximum rotation of the cap of 90°.

The sleeve attaches to the fuel container and provides a non-circular opening for filling the container. The non-circular opening includes a sealing surface. The cap includes a handle, an anchor disk, and a sealing member. The sealing member includes a flexible seal for sealing against the sealing surface. A spring is disposed between the handle and the sealing member for biasing the seal into engagement with the sealing surface. A cam is disposed between the sealing member and the anchor disk.

The cap is inserted into the sleeve such that the anchor disk passes completely through the opening and the sealing member non-rotatably engages the opening. The handle is then rotated relative to the sleeve, causing the anchor disk to rotate. The seal, under the action of the cam and the expanding spring, axially engages the sealing surface upon rotation of the handle but at no time rotates relative to the sealing surface. Upon rotation of the handle, the anchor disk engages the opening to anchor the cap in the sleeve. A slot in the anchor disk prohibits rotations greater than one quarter. The cap is thus sealed with only a one quarter turn in rotation.

DETAILED DESCRIPTION OF THE INVENTION

Figures 1, 2:
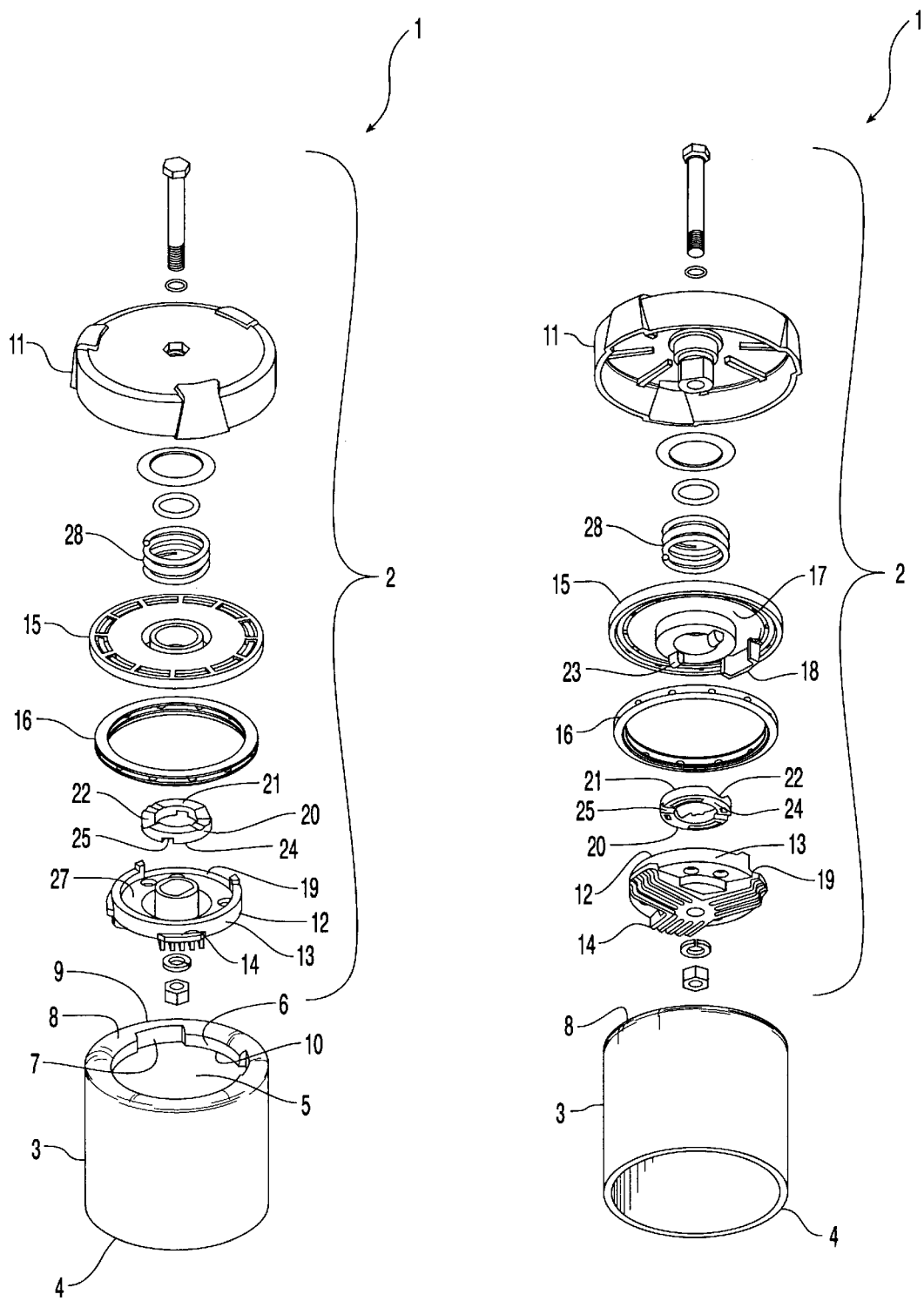
FIG. 1 is an exploded top perspective view of the one quarter turn fuel cap assembly.
FIG. 2 is an exploded bottom perspective view of the one quarter turn fuel cap assembly.

Referring to FIGS. 1 and 2, the fuel cap assembly 1 in accordance with the present invention includes a fuel cap 2 and sleeve 3.

Figure 5:
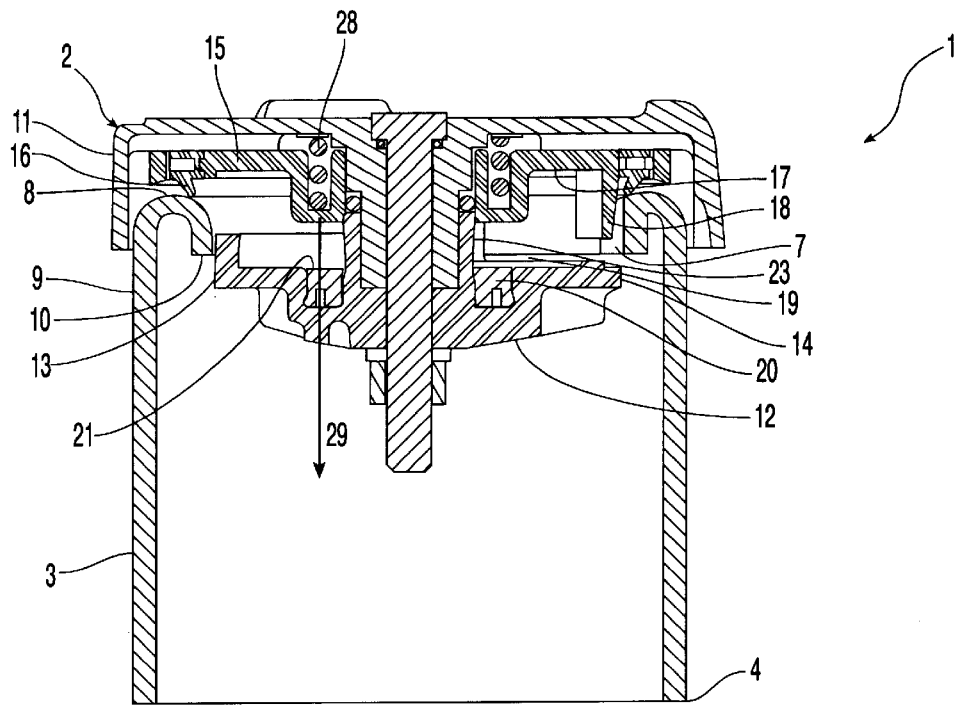
FIG. 5 is a cross-sectional view through lines 5—5 of FIG. 3.
Figure 6:
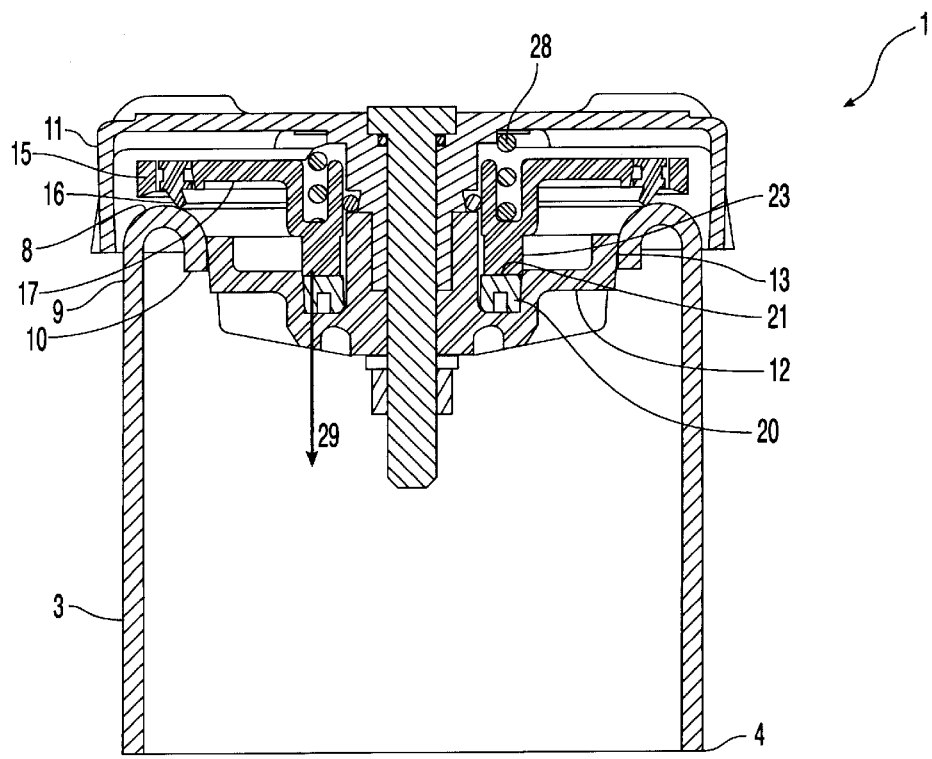
FIG. 6 is a cross-sectional view through lines 6—6 of FIG. 3.
Figure 7:
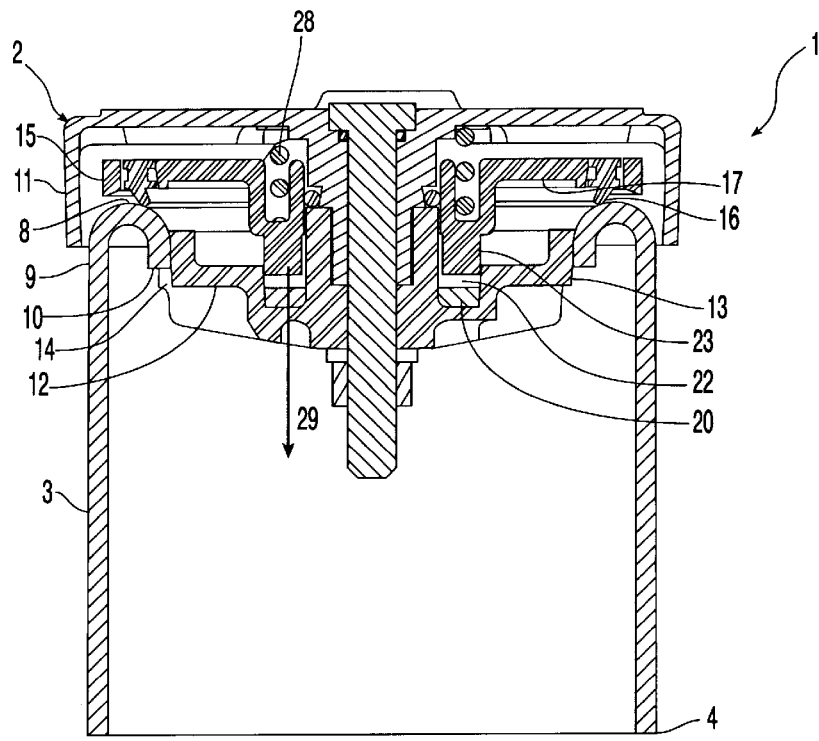
FIG. 7 is a cross-sectional view through lines 7—7 of FIG. 4.

The sleeve 3 includes a tank end 4 for attachment to a fuel tank and an open end having an opening 5 to accommodate filling of the fuel tank. The opening 5 is defined by a non-circular inner surface 6 of the sleeve 3. The inner surface 6 includes a plurality of radially displaced notches 7. A rim 8 forms a rounded transition from the inner surface 6 to the outer surface 9 of the sleeve 3 as is best shown in FIGS. 5–7. The rim 8 defines the sealing surface of the sleeve 3. The inner surface 6 extends into the opening 5, terminating at an inner edge 10.

The fuel cap 2 includes a handle 11 for the user to grip when inserting and rotating the fuel cap 2. Further, the handle 11 acts as a cap, covering the sleeve 3 and extending over the outer surface 9.

Figure 3:
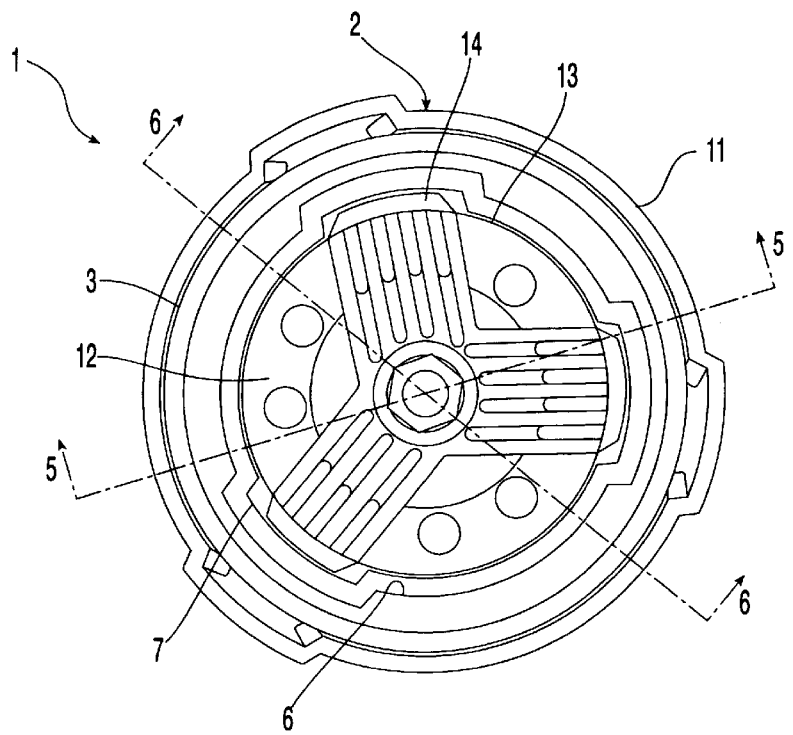
FIG. 3 is a bottom view of the one quarter turn fuel cap assembly in the open position.

The fuel cap 2 includes an anchor disk 12 axially displaced from and non-rotatably connected to the handle 11. The anchor disk 12 includes a non-circular border 13 having a plurality of radially outwardly projecting dogs 14. The anchor disk 12 will only pass through the inner surface 6 of the sleeve 3 when the dogs 14 are aligned with the notches 7 as shown in FIGS. 3 and 5.

A generally disk shaped sealing member 15 is disposed between the handle 11 and the anchor disk 12. The sealing member 15 includes a seal 16. The seal 16 is disposed on a bottom surface 17 of the sealing member 15. The bottom surface 17 includes at least one tab 18 for engaging the radially displaced notches 7 in the sleeve 3 such that when the fuel cap 2 is inserted into the sleeve 3, the sealing member 15 is non-rotatably engaged with the sleeve 3. Therefore, the seal 16 contacts the rim 8 when the fuel cap 2 is inserted into the sleeve 3 and closed, as shown in FIGS. 5–7, but is prohibited from rotating relative to the rim 8 when the handle 11 is rotated. The tab 18 also engages a travel limiting slot 19 in the anchor disk 12 defining an arc of a circle centered on said anchor disk 12 and representing an angle of rotation of between 0 and 90 degrees as shown in FIG. 5.

Figure 9:
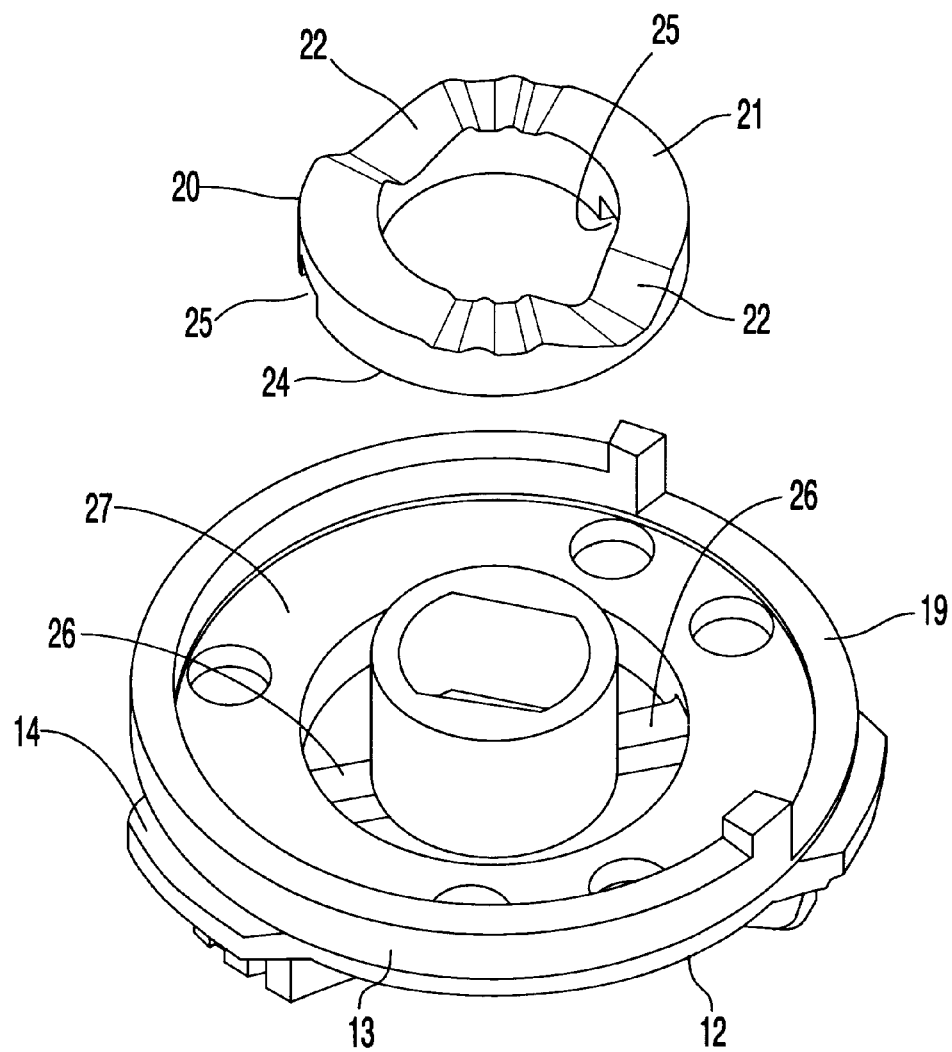
FIG. 9 is a partial exploded perspective view of the fuel cap.

A cam disk 20 is disposed between the sealing member 15 and the anchor disk 12. The bearing surface of the cam disk 20 has a first cam position surface 21 and a pair of second cam position surfaces 22 for engaging a pair of nubs 23 disposed on the bottom surface 17 of the sealing member 16. As is shown in FIG. 2, the cam disk 20 also includes a bottom side 24 having a plurality of key holes 25 for engaging keys 26 (FIG. 9) located on the top surface 27 of the anchor disk 12. The cam disk 20 is thus non-rotatably engaged with the anchor disk 12. Alternatively, the cam disk 20 may be permanently affixed to the anchor disk 12. In addition, indentations may be disposed on the bottom surface 17 of sealing member 15 and nubs located on the top surface 27 of the anchor disk 12. The material of the cam disk 20 is selected to provide the best bearing surface possible. In the preferred embodiment, the cam disk is made of acetal resins or polyacetals.

A spring 28 is disposed between the handle 11 and the sealing member 15 and biases the sealing member 15 away from the handle 11 and towards the rim 8 of the sleeve 3 as indicated by arrow 29 in FIGS. 5–7. The spring 28 is disposed such that the spring is held under compression when the fuel cap assembly 1 is open and allowed to expand when the fuel cap assembly 1 is closed. Therefore, the spring 28 expansively biases the fuel cap 2 toward the closed or sealed position.

Figure 4:
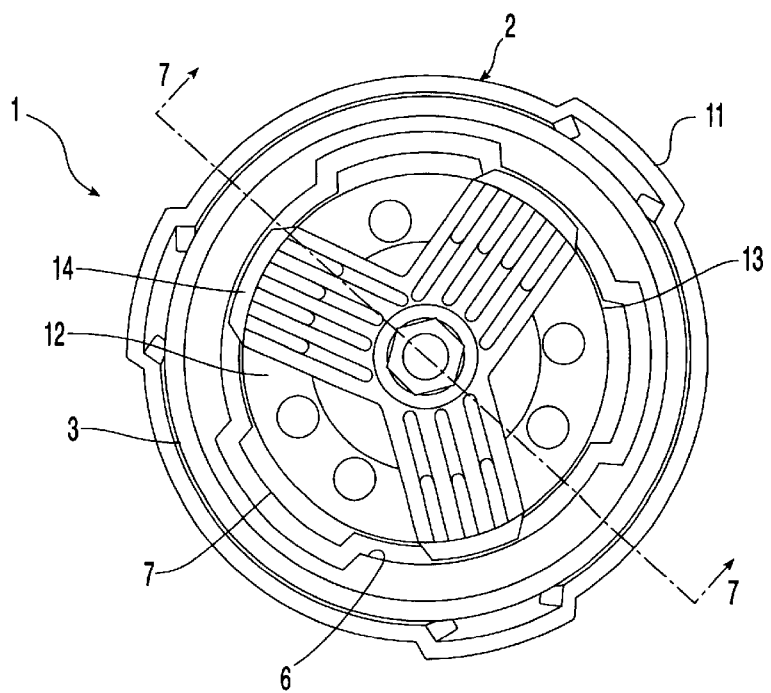
FIG. 4 is a bottom view of the one quarter turn fuel cap assembly in the closed position.
Figure 8:
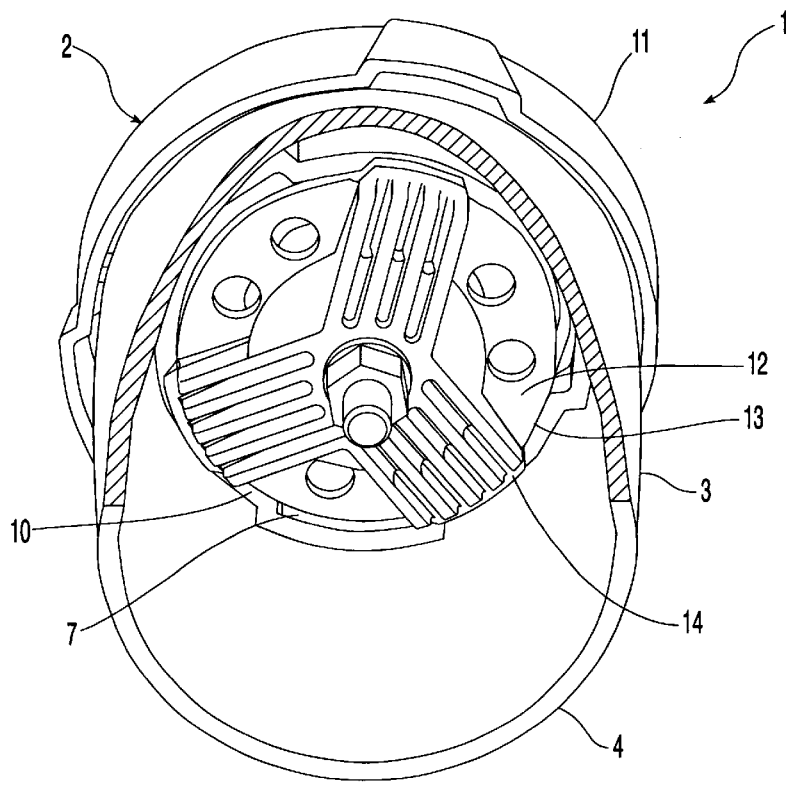
FIG. 8 is a cut-away bottom perspective view of the one quarter turn fuel cap assembly in the closed position.

In order to seal the fuel cap assembly 1, the fuel cap 2 is inserted into the sleeve 3 such that the dogs 14 of the anchor disk 12 pass through the radially displaced notches 7 of the non-circular inner surface 6 of the sleeve 3, as shown in FIG. 3. The fuel cap 2 is inserted until the dogs 14 clear the inner edge 10 as shown in FIG. 5. At this point, the handle is in a first position corresponding to the open position of the fuel cap; the tab 18 of the sealing member 15 is engaged in the radially displaced notches 7 of the inner surface 6 of the sleeve 3 as shown in FIG. 5; the flexible seal 16 engages the rim 8 as shown in FIGS. 5 and 6, and the nubs 23 are in contact with the first cam position surface 21 of the cam disk 20 and therefore raised above the anchor disk 12 as shown in FIG. 6, holding the spring 28 in a compressed state. The handle 11, and hence the anchor disk 12, is rotated relative to the sleeve 2 and the sealing member 15 to a second position corresponding to the closed position of the fuel cap. As shown in FIG. 7, the nubs 23 slide along the first cam position surface 21, engage the second cam position surfaces 22 of the cam disk 20, and advance downwardly away from the first cam position surface 21 and toward the anchor disk 12. Further, the spring 28 moves to an expanded state, pushing the sealing member 15 away from the handle 11 in the direction of arrow 29 and seating the seal 16 against the rim 8 without rotating the seal 16 relative to the rim 8. At the same time, the anchor disk 12 rotates such that the dogs 14 move away from the radially displaced notches 7 and engage the inner edge 10 as shown in FIGS. 4, 7, and 8. The anchor disk 12 secures the fuel cap 2 in the sleeve 3 and working in conjunction with the sealing member 15 and spring 28 holds the seal 16 against the rim 8 to form an air tight seal. The entire sealing operation is accomplished with less than a one quarter turn in rotation of the handle. Excessive rotation is prevented by the travel limiting slot 19 into which the tab 18 of the sealing member 15 extends. The travel limiting slot 19 passes over the tab 18 from a first slot end to a second slot end during rotation of the handle 11 as shown in FIG. 5. At no time during the insertion, closing, and sealing of the fuel cap 2 does the seal 16 rotate relative to the rim 8, ensuring greater life to the seal 16. By rotating the handle 11 through one quarter turn or less in the opposite direction, the fuel cap 2 is unsealed and may be removed from the sleeve 3.

What is claimed is:

1. A cap having an open position and a closed position for sealing against a scaling surface in an opening of a container, comprising:

a.) a handle rotatable between a first position corresponding to the open position of the cap and a second position corresponding to the closed position of the cap;

b.) an anchor disk non-rotatably connected to said handle, said anchor disk shaped to pass axially through said opening and to engage an inner edge of said opening to prevent axial passage of the anchor disk through the opening upon rotation of said handle from said first position to said second position;

c.) a generally disk shaped sealing member disposed between the handle and the anchor disk and having a seal for engaging said sealing surface upon rotation of said handle from said first position to said second position, said sealing member shaped to non-rotatably sit within said opening to prevent rotation of said seal relative to said sealing surface upon rotation of said handle; and d.) a compression member for biasing the seal into engagement with the sealing surface when said handle is in said second position said compression member movable between a compressed state when said handle is in said first position and an expanded state when said handle is in said second position, said compression member being connected between said sealing member and said handle.

2. The cap of claim 1 wherein the compression member is a compression spring.

3. The cap of claim 2 further comprising a cam disposed between the sealing member and said anchor disk, said cam having a first cam position when said handle is in said first position to thereby maintain said spring in said compressed state and a second cam position when said handle is rotated to said second position thereby allowing said spring to expand to said expanded state.

4. The cap of claim 3 wherein the sealing member has a bottom surface and the anchor disk has a top surface, said bottom surface of said sealing member facing said top surface of said anchor disk, said cam further comprising:

a.) a cam surface disposed between said bottom surface of said sealing member and said top surface of said anchor disk and facing the bottom surface of the sealing member, said cam surface having a first portion and at least one second portion extending away from said bottom surface of said sealing member; and b.) a cam follower disposed on said bottom surface of said sealing member and in engagement with said first portion of said cam surface when said handle is in said first position, said cam follower engaging said second portion upon rotation of said handle through an angle up to about 90° to said second position.

5. The cap of claim 4 wherein the cam surface comprises a cam disk fixed to said top surface of said anchor disk.

6. The cap of claim 5 wherein the cam disk comprises acetal resins.

7. The cap of claim 4 wherein said opening of said container further comprises at least one radially displaced notch, said sealing member further comprises at least one tab extending from said bottom surface, said tab engaging said notch when said cap is inserted in said opening, preventing rotation of said sealing member and said seal relative to said sealing surface upon rotation of said handle, and said anchor disk comprises at least one radially outwardly displaced dog, said dog passing through said notch when the cap is axially inserted into said opening and engaging said inner edge of said opening when said handle is rotated through an angle up to about 90° to said second position.

8. The cap of claim 7 further comprising a rotation limiting slot defined in said top surface of said anchor disk by a oath of movement traced by said tab upon rotation of said handle from said first to said second position, said slot having a first abutment end, and said tab being in contact with said first end of said slot when said handle is rotated to said second position, preventing rotation of said handle through an angle greater than about 90°.

9. The cap of claim 8 wherein said rotation limiting slot further comprises a second end, said first and second ends defining an arc of a circle centered on said anchor disk, said arc subtending an angle of rotation up to about 90 degrees.

10. A cap having an open position and a closed position for sealing against a sealing surface in an opening of a container, comprising:
   a.) a handle rotatable between a first position corresponding to the open position of the cap and a second position corresponding to the closed position of the cap;
   b.) an anchor disk non-rotatably connected to said handle, said anchor disk shaped to pass axially through said opening and to engage an inner edge of said opening to prevent axial passage of the anchor disk through the opening upon rotation of said handle from said first position to said second position;
   c.) a sealing member disposed between the handle and the anchor disk and having a seal for engaging said sealing surface upon rotation of said handle from said first position to said second position;
   d.) at least one radially displaced notch disposed in said opening;
   e.) a tab extending from said sealing member, said tab engaging said notch when said cap is inserted in said opening, preventing rotation of said seal relative to said sealing surface upon rotation of said handle;
   f.) a biasing member disposed between said sealing member and said handle for biasing the seal into engagement with the sealing surface; and
   g.) a rotation limiting slot defined in said anchor disk by a path of movement traced by said tab upon rotation of said handle from said first to said second position, said slot having a first abutment end, and said tab being in contact with said first end of said slot when said handle is rotated to said second position, preventing rotation of said handle through an angle greater than about 90 degrees.

11. The cap of claim 10 wherein said rotation limiting slot further comprises a second end, said first and second ends defining an arc of a circle centered on said anchor disk, said are subtending an angle of rotation up to about 90 degrees.

* * * * *